US009675968B2

(12) United States Patent
Alonso Nunez et al.

(10) Patent No.: US 9,675,968 B2
(45) Date of Patent: Jun. 13, 2017

(54) SUPPORTED CATALYSTS FOR PRODUCING ULTRA-LOW SULPHUR FUEL OILS

(71) Applicant: UNIVERSIDAD NACIONAL AUTONOMA DE MEXICO, Distrito Federal (MX)

(72) Inventors: Gabriel Alonso Nunez, Baja California (MX); Trino Armando Zepeda Partida, Baja California (MX); Sergio Fuentes Moyados, Baja California (MX); Elena Smolentseva, Baja California (MX); Jorge Noe Diaz De Leon Hernandez, Baja California (MX)

(73) Assignee: UNIVERSIDAD NACIONAL AUTONOMA DE MEXICO, Distrito Federal (MX)

(*) Notice: Subject to any disclaimer, the term of this patent is extended or adjusted under 35 U.S.C. 154(b) by 0 days.

(21) Appl. No.: 14/442,863

(22) PCT Filed: Nov. 14, 2013

(86) PCT No.: PCT/MX2013/000140
§ 371 (c)(1),
(2) Date: May 14, 2015

(87) PCT Pub. No.: WO2014/088388
PCT Pub. Date: Jun. 12, 2014

(65) Prior Publication Data
US 2015/0306585 A1    Oct. 29, 2015

(30) Foreign Application Priority Data

Nov. 14, 2012 (MX) .................... MX/a/2012/013217

(51) Int. Cl.
*B01J 21/04* (2006.01)
*B01J 23/28* (2006.01)
(Continued)

(52) U.S. Cl.
CPC ........... *B01J 29/166* (2013.01); *B01J 23/882* (2013.01); *B01J 23/883* (2013.01); *B01J 23/888* (2013.01);
(Continued)

(58) Field of Classification Search
CPC .... B01J 21/04; B01J 35/1061; B01J 35/1042; B01J 35/1019; B01J 35/1023;
(Continued)

(56) References Cited

U.S. PATENT DOCUMENTS

| 5,342,507 A * | 8/1994 | Dai ........................ C10G 47/20 |
| | | 208/111.15 |
| 2002/0094931 A1* | 7/2002 | Wang ........................ B01J 29/08 |
| | | 502/63 |

(Continued)

FOREIGN PATENT DOCUMENTS

| EP | 1 577 007 | * 9/2005 | .............. B01J 31/34 |
| EP | 1577007 A1 | 9/2005 | |
| WO | 2011002782 A2 | 1/2011 | |

OTHER PUBLICATIONS

"Hydrotreating of light cycle oil using WNi catalytsts containing hydrothermally and chemically treated zeolite Y," Lianhui Ding et al. Catalysis Today 125 (2007), pp. 229-238.*
(Continued)

*Primary Examiner* — Patricia L Hailey
(74) *Attorney, Agent, or Firm* — Lucas & Mercanti, LLP

(57) ABSTRACT

The present invention relates to the preparation of catalysts used in the hydrodesulfurization of fossil fuels and proposes a method for preparing thermally stable, low-cost catalysts for the hydrodesulfurization of petrol and diesel, based on highly active CoMo and NiMo. The catalyst for the hydroprocessing of gasoil or petrol in the present invention comprises a precursor which consists of chemical com-
(Continued)

pounds obtained from organic acids and metal salts, and a support containing an ultra-stable Y-type zeolite useful in the hydroprocessing of heavy gas oil and/or light cyclic gas oil with high conversion rates.

19 Claims, 2 Drawing Sheets

(51) Int. Cl.
*B01J 23/30* (2006.01)
*B01J 23/75* (2006.01)
*B01J 23/755* (2006.01)
*B01J 29/16* (2006.01)
*C10G 45/12* (2006.01)
*B01J 23/882* (2006.01)
*B01J 23/883* (2006.01)
*B01J 23/888* (2006.01)
*B01J 27/049* (2006.01)
*B01J 27/051* (2006.01)
*B01J 35/00* (2006.01)
*B01J 35/10* (2006.01)
*B01J 37/02* (2006.01)
*C10G 45/08* (2006.01)
*B01J 37/08* (2006.01)
*B01J 37/20* (2006.01)

(52) U.S. Cl.
CPC ......... *B01J 23/8885* (2013.01); *B01J 27/049* (2013.01); *B01J 27/051* (2013.01); *B01J 27/0515* (2013.01); *B01J 29/16* (2013.01); *B01J 35/006* (2013.01); *B01J 35/0013* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 37/0203* (2013.01); *B01J 37/0207* (2013.01); *B01J 37/082* (2013.01); *B01J 37/20* (2013.01); *C10G 45/08* (2013.01); *C10G 45/12* (2013.01); *B01J 35/002* (2013.01); *B01J 37/0213* (2013.01); *B01J 37/0236* (2013.01); *B01J 37/086* (2013.01); *B01J 2229/186* (2013.01); *C10G 2400/02* (2013.01); *C10G 2400/04* (2013.01)

(58) Field of Classification Search
CPC ...... B01J 35/108; B01J 27/043; B01J 27/051; B01J 27/0515; B01J 23/28; B01J 23/30; B01J 23/75; B01J 23/755; B01J 23/882; B01J 23/883; B01J 23/888; B01J 23/8885
USPC ............................ 502/60, 79, 315, 321, 322
See application file for complete search history.

(56) References Cited

U.S. PATENT DOCUMENTS

2005/0197249 A1* 9/2005 Creyghton ............. B01J 23/888
  502/439
2012/0258852 A1* 10/2012 Martinez ................ B01J 29/041
  502/60
2015/0126791 A1* 5/2015 Kijlstra .................... B01J 37/20
  585/653

OTHER PUBLICATIONS

"NiMo/Al2O3 catalyst containing nano-sized zeolite Y for deep hydrodesulfurization and hydrodenitrogenation of diesel," Hailiang Yin et al. Journal of Natural Gas Chemistry 20 (2011), pp. 441-448.*
"Bimetallic Co—Mo complexes: A starting material for high active hydrodesulfurization catalysts," Oleg V. Klimov et al. Catalysis Today 150 (2010), pp. 196-206.*
L. Ding, et al; Hydrotreating of light cycle oil using WNi catalysts containing . . . ; Science Direct; Catalysis Today; vol. 125; 2007; pp. 229-238.
H. Yin, et al; NiMo/Al2O3 catalyst containing nano-sized zeolite Y for deep . . . ; Science Direct; Journal of Natural Gas Chemistry; vol. 20; 2011; pp. 441-448.
O. V. Klimov, et al; Bimetallic Co—Mo complexes: A starting material for high active . . . ; Catalysis Today; vol. 150; 2010; pp. 196-206.
International Search Report dated Mar. 19, 2014 for PCT/MX2013/000140 and English translation.

* cited by examiner

SUPPORTED CATALYSTS FOR PRODUCING ULTRA-LOW SULPHUR FUEL OILS

CROSS REFERENCE TO RELATED APPLICATION

This Application is a 371 of PCT/MX2013/000140 filed on Nov. 14, 2013 which, in turn, claimed the priority of Mexican Patent Application No. MX/a/2012/013217 filed on Nov. 14, 2012, both applications are incorporated herein by reference.

FIELD OF THE INVENTION

The present invention relates to the preparation of typical catalysts used for fossil fuel hydrodesulfurization. Specifically, the present invention refers to a method of preparation of thermally stable and low cost catalysts for gasoline and diesel hydrodesulfurization, based on highly active CoMo and NiMo.

BACKGROUND OF INVENTION

Hydrodesulfurization process was introduced more than 50 years ago in refineries for fuel quality improvement and for reduction of $SO_2$ emissions to atmosphere. A constant catalyst improvement along years has allowed production of ultra-low sulfur fuels for use in transportation (Catal. Today 86 (2003) 211). HDS catalyst active phase still continues the same from then on, $Mo(W)S_2$, Co(Ni) and alumina. Catalytic community has proposed several models for active sites, such as the sandwich model, decoration model, electronic model, etc. (H. Topose, B. S. Clausen, F. E. Massoth, In Hydrotreating Catalysts: Science and Technology; Springer: Berlin, 1996). Models which explain the selectivity for direct hydrogenation and desulfurization mechanisms in HDS have been also proposed by Daage (cap/edge) and Topsoe (edge) depending on active site relationship. Multi-component catalysts can be currently designed with a proper function balance to respond to technical demands in ultra-low sulfur gasoline or diesel production, particularly for those fuels produced from heavy crude oils with contents of more than 3% of S by weight and 1% of nitrogenated compounds.

Gas oils commonly produce emissions such as nitrogen oxide, sulfur oxide and carbon solid particles in oil industry, particularly in case of fuels based on petroleum intermediate distillates. Government regulations have been more restrictive in recent years with respect to allowed levels of potentially harmful emissions, leading to a need of deeper gas oil desulfurization (HDS) thus meeting worldwide environmental regulations in force (Catalysis Today 153 (2010) 1-68)

Nowadays, many countries around the globe limit allowed sulfur content in gasoline to less than 50 ppm, and in some specific cases such as Germany, France, Denmark and Sweden up to <10 ppm S (Stanislaus et al.). As environmental concerns grow, allowed sulfur content in gasoline soon may be limited in our country to 10 ppm or even lower. According to these limitations, catalysts and processes for fuel production meeting these requirements would be needed.

Catalytic desulfurization generally includes hydrogenation of susceptible compounds such as olefinic compounds which are present in oil fractions (U.S. Pat. No. 0,230,026 A1). Thus for example in case of high-octane catalytic naphtha, olefins are necessary and thus selective modifiers to decrease hydrogenation reactions are required. Generally, the preparation method used for commercial HDS catalysts is by means of support impregnation with Mo, Co or Ni aqueous solutions. Final structure of molybdenum disulfide surface is achieved in the last preparation stage, where oxide precursor is treated with agents containing sulfur ($H_2S/H_2$, DMDS, etc). In this way both, size and morphology of $MoS_2$ resulting particles is affected by several factors such as: (i) the election of Mo compounds, (ii) the influence of chelating species, (iii) precursor structure and dispersion, (iv) the nature of the support itself and its modifiers, (v) surface concentration and Mo species dispersion and finally (vi) the conditions of sulfurization procedure (Catal. Today 150 (2010) 196).

Two types of Co(Ni)—Mo—S active phase models are disclosed in literature. Type-I Co(Ni)—Mo—S phase is characterized by a strong interaction with the support due to Mo—Al—O binding formation and because of a lower sulfurization degree of total Mo available. In type-II Co(Ni)—Mo—S phase, particles are fully sulfurated and Van der Waals type forces keep them on support surface, the specific activity per Co atom number in type-II Co—Mo—S phase is considerably higher than the activity reported for type-I phase. Modern catalysts for deep fuel hydroprocessing such as for diesel are very efficient due to high dispersion and high active phase concentrations therein contained (Catal. Today 149 (2010), 19).

There are several intents reported in literature to selectively obtain highly active CoMoS phase catalysts. There is a method among them including the use of chelating agents in impregnation solutions such as nitriloacetic acid, acetylacetonate, phthalocyanine and ethylendiamine (Appl. Surf. Sci 121/122 (1997) 468). Chelating agents are molecules having two or more donor atoms helping to link a metal cation to form a chelate. By adding chelating molecules to the impregnation solution, the preparation of supported catalysts having an equivalent or higher activity than their commercial counterparts supported on —$Al_2O_3$ would be in principle possible for gas oil treatment. Chelating molecules such as ethylendiaminotetraacetic acid (EDTA), nitriloacetic acid (NTA), 1,2-cyclohexanediamine-N,N,N',N"-tetraacetic acid (CyDTA) and ethylendiamine (EN) have been traditionally used. Still since 1986 a patent was issued for use of such ligands (M. S. Thompson, European Patent EP 0,181, 035 A2).

Catalyst synthesis method starts with the preparation of aqueous solutions with $Co^{2+}$, $Ni^{2+}$ ions and molybdates which are usually added to porous supports, such as silica and -alumina by incipient impregnation or pore filling. Drying then continues at 120-150° C., and then the catalyst precursor material is fired between 400 and 500° C. to remove counter ions by decomposition. This allows obtaining Co, Ni and Mo ions in oxide state strongly anchored to the support. Interaction of catalyst precursors with the support may be prevented by the use of organometallic complexes of these ions. In this case, sulfurization and preparation of type-II Co—Mo—S active phase is possible. Furthermore, it is important to care about the thermodynamic equilibrium between molybdates, $Co^{2+}$, $Ni^{2+}$ and chelating ligands as function of pH and about Ni:Mo or Co:Mo ratios in aqueous solutions (Catal. Today 86 (2003) 173).

Fetchin (U.S. Pat. No. 4,409,131, 1983) performs the synthesis of NiMo and CoMo catalysts supported on $Al_2O_3$. For catalyst synthesis in a first stage, cobalt citrate ammoniacal solutions were prepared from citric acid and $CoCO_3$. This solution was heated until boiling point and then cooled.

Ammonium hydroxide was added to the resulting solution and diluted to add HMA. This solution was impregnated on Al$_2$O$_3$ support.

Rinaldi et al. (Appl. Catal. A: General 360 (2009) 130) studied the effect of citric acid on CoMo/B$_2$O$_3$/Al$_2$O$_3$ catalysts. Catalysts are synthesized by simultaneously impregnating the B$_2$O$_3$/Al$_2$O$_3$ support with HMA, AC and cobalt nitrate.

Wu et al. (U.S. Pat. No. 0,321,320, 2009) prepared NiMo and CoMo catalysts supported on Al$_2$O$_3$, prepared from Ni(Co) and Mo salts, in addition to an organic acid such as citric acid or urea. Catalysts so prepared showed lower olefin saturation compared to a reference CoMo catalyst.

Ebel et al (U.S. Pat. No. 4,120,826, 1978) synthesized CoMoP/Al$_2$O$_3$ catalysts using cobalt nitrite, H$_3$PO$_4$ and MoO$_3$ as active phase precursors. The phase was impregnated by incipient wetting, and catalysts were dried at 120° C. for 30 min and fired at 538° C. for 1 hour.

Gabrielov et al (U.S. Pat. No. 6,281,158 B1, 2001) synthesized NiCoMoP/Al$_2$O$_3$ catalysts using different active phase precursors. As to Ni precursors, NiCO$_3$ and NiO were used; as to Mo precursors, phosphomolybdic acid, (NH$_4$)$_2$MO$_2$O$_7$, and MoO$_3$ were used while H$_3$PO$_4$ was used as P source. As to Co precursor, CoCO$_3$ was used.

Klimov et al., Catal. Today 150 (2010), 196) introduced a method for catalyst synthesis based on application of Co—Mo labile complexes in aqueous solution with a 2 to 3 Mo atoms per Co atom ratio. The procedure to fix active species on support surface prevented a bimetallic complex decomposition. Bimetallic complexes are synthesized from several ammoniacal Mo salts. By using [Mo$_4$O$_{11}$(C$_6$H$_5$O$_7$)$_2$]$^{4-}$ as Mo precursor salt (synthesized from ammonium heptamolybdate, HMA, and citric acid), cobalt acetate (Co(CH$_3$COO)$_2$.4H$_2$O) was used as Co precursor, keeping a Co:Mo stoichiometric ratio of 1:2. The impregnated support with the prepared solution was dried in air at 110° C. Catalyst sulfuration was made at 400° C. The catalyst thus prepared was more active than a reference CoMoP/Al$_2$O$_3$ industrial catalyst and other catalysts prepared by the authors.

Pashigreva et al (Catal. Today 149 (2010), 19) report the use of catalysts synthesized from the same precursors used by Klimov et al. (2010 a and b), but modifying the support impregnation method and catalyst sulfuration. Active phase was synthesized from ammonium heptamolybdate, citric acid and cobalt acetate. A higher catalytic performance was also observed in this sample, compared to an industrial CoMo sample which was used as reference.

U.S. Pat. No. 7,618,916 B2 reveals a process for production of a hydrotreating catalyst by a single method, capable of performing an ultra-deep hydrodesulfurization of sulfur compounds present in gas oil without using severe operational conditions. The process comprises impregnation of an inorganic oxide support with metal compounds of Group 6 and Group 8 in the periodic table, an organic acid and phosphoric acid, followed by drying.

Ding et al (Catal. Today 125 (2007) 229) synthesized NiW catalysts supported on Y-type alumina-zeolite composed materials and they were evaluated in light cyclic oil hydrotreating reactions. Supports were prepared by mixing zeolites, alumina (22 or 37% by weight) and a peptidized alumina binder (20% by weight). Materials were firstly dried at 120° C. and then fired at 550° C. for 5 h. Ammonium metatungstate and nickel nitrate were used as active phase precursors. Zeolite final content in catalysts was 15 or 28% for different synthesized materials.

Catalysts used in hydrocracking are of bifunctional type, conjugating acidic with hydrotreating function. Conventional catalysts for catalytic hydrocracking mostly consist of weakly acidic substrates such as amorphous silica-alumina. Many catalysts in hydrocracking market have a silica-alumina base combined with metals from Groups 6 or 8 in the periodic table. Catalysts comprising Y-zeolite with a FAU type or beta-type structure have a catalytic activity higher than those of amorphous silica-alumina in addition to a higher selectivity towards light products. For example, HY-zeolite which is widely used as important component in hydrocracking bifunctional catalysts catalyzes heavy fraction cracking due to its high acidity (Appl. Catal. A: Gen. 344 (2008) 187). It has been proposed that an increase in HDS activity by introducing HY-zeolite might be related to an increase in acidity in mixed supports. Bronsted acidity is capable of catalyzing hydrocracking, isomerization and hydrogenation, which are generally involved in a typical HDS process of petroleum fractions. Addition of less than 10% by weight of zeolite in a CoMo supported on Al$_2$O$_3$ was also shown to be capable of increasing HDS activity up to 40% compared to a conventional CoMo/Al$_2$O$_3$ catalyst when a direct distillation gas oil was evaluated (1.38% by weight of S) (Catal. Today 35 (1997) 45).

Y-zeolite which is used for catalytic cracking processes is produced by a modification of commercially available NaY-zeolite. This process makes possible the modification of stable, ultra-stable zeolites as well as dealuminated zeolites. Preferably, this modification is performed by a combination of three types of operations: (i) hydrothermal treatment, (ii) ionic exchange and (iii) acidic attack. Hydrothermal treatment is perfectly defined by joining operational variables, such as temperature, duration, total pressure and steam partial pressure, with this treatment is possible to extract aluminum from zeolite structure (U.S. Pat. No. 4,277,373). In practice, small zeolite catalyst particles may not be used directly since the powdered material is hard to manage and will cause a pressure drop problem in a packed bed reactor. Therefore, zeolites are normally mixed with inorganic oxides using a binder and the resulting mixture may be extruded with certain shape and size such as reported in literature (Catal. Today 116 (2006) 469), (Appl. Catal. A: Gen. 319 (2007) 25), (Energy Fuels 24 (2010) 796) (Catal. Today 98 (2004) 201).

Dai et al (U.S. Pat. No. 5,308,472, 1994) show a hydrocracking process using Ni(Co)MoP catalyst supported on alumina and silica-alumina with a percentage content by weight of HY-type dealuminated zeolite between 5 and 35%. Ammonium heptamolybdate and nickel nitrate were used as active phase precursors.

Duan et al (J., Catal. Today 175 (2011) 485) synthesized NiMo catalysts supported on alumina-beta zeolite. The mixed support was obtained by mechanical mixture and zeolite content therein varied between 8 and 40% by weight. With a catalyst with a content of 32% by weight of beta zeolite, a removal of 99.4% of S was obtained for a diesel stock with an initial S concentration of 1.3 mg·g$^{-1}$. Higher zeolite contents favor cracking and coke deposition. Nickel nitrate and ammonium heptamolybdate were used as active phase precursors.

A number of groups have studied the effect of nano and micro zeolites in hydroprocessing catalysts. Ding et al., reported recently the effect of beta zeolite particle size in HDS, HDN and HDA activities used in light cyclic oil hydrotreating with NiMo and NiW catalysts supported on beta-type nano and micro zeolites (Appl. Catal. A: Gen. 353 (2009) 17). Authors reported that there were no significant differences in pore structure, crystalline phases and interactions between metals and supports in two catalysts. They also showed similar activities in light cyclic oil (ACL) HDS and HDN. However, the catalytic behavior in HDS and HDN of a NiW/Al$_2$O$_3$ catalyst with nano-zeolite, was higher than the catalyst prepared with micro zeolite. Another work studied the effect of nano and micro Y-zeolite in HDS and HDN activities with a catalytic cracking diesel in a fluidized bed reactor, using NiMo/Al$_2$O$_3$ mixed catalysts (J. Natural Gas Chem. 20 (2011) 411. The catalyst with nano Y-zeolite showed higher pore average diameters, higher pore volume, a lower amount and less strength of acidic sites, an easier reduction of metal phases, shorter MoS$_2$ films, as well as higher film stack compared to a catalyst prepared with micro Y-zeolite.

Yin et al. (J. Natural Gas Chem. 20 (2011) 441) prepared NiMo/Al$_2$O$_3$ catalysts with type micro- and nano-zeolite and (10% by weight in both cases). Supports were obtained by means of a zeolite mechanical mixture with alumina support. Catalysts were synthesized by co-impregnation of Ni$_2$(OH)$_2$CO$_3$ and MoO$_3$ aqueous solutions. Catalysts with nano-zeolite were more active in HDS and HDN reactions by factors of 3.5 and 2.7, respectively, compared to other samples.

OBJECT OF INVENTION

Taking into account the prior art defects, it is an object of present invention to provide a low-cost and thermally stable catalyst for gasoline and diesel hydrodesulfurization without requiring severe operational conditions to produce ultra-low sulfur fuels.

An additional object of present invention is to provide a CoMo or NiMo supported catalyst, which are typical catalysts used for fossil fuel hydrodesulfurization.

A further object of present invention is to provide a catalyst which removes dibenzothiophene (DBT) type compounds substituted with alkyl groups, as well as olefin and aromatic hydrogenation capability, significant to produce ultra-low sulfur fuels.

It is another object of present invention to provide a catalyst with low Mo, Co o Ni metal load based on impregnated substrate weight.

Even another object of present invention, is to provide a method of preparation of a catalyst providing optimized morphology and dispersion to MoS$_2$ and Co(Ni)/MoS$_2$ nanostructures which determine HDS processing capability for gasoline or diesel.

It is a further object of present invention to provide a method including addition of zeolite nanocrystals to a support for improvement of HDS activity of catalysts as well as their selectivity towards a direct desulfurization route.

DESCRIPTION OF FIGURES

The novel aspects which are considered characteristics of present invention will be particularly described in attached claims. However, the invention itself with its structural organization together with other objects and advantages thereof will be better understood in the following detailed description of certain preferred embodiments when being read in connection with the attached drawings wherein:

DETAILED DESCRIPTION OF THE INVENTION

Figure 1:
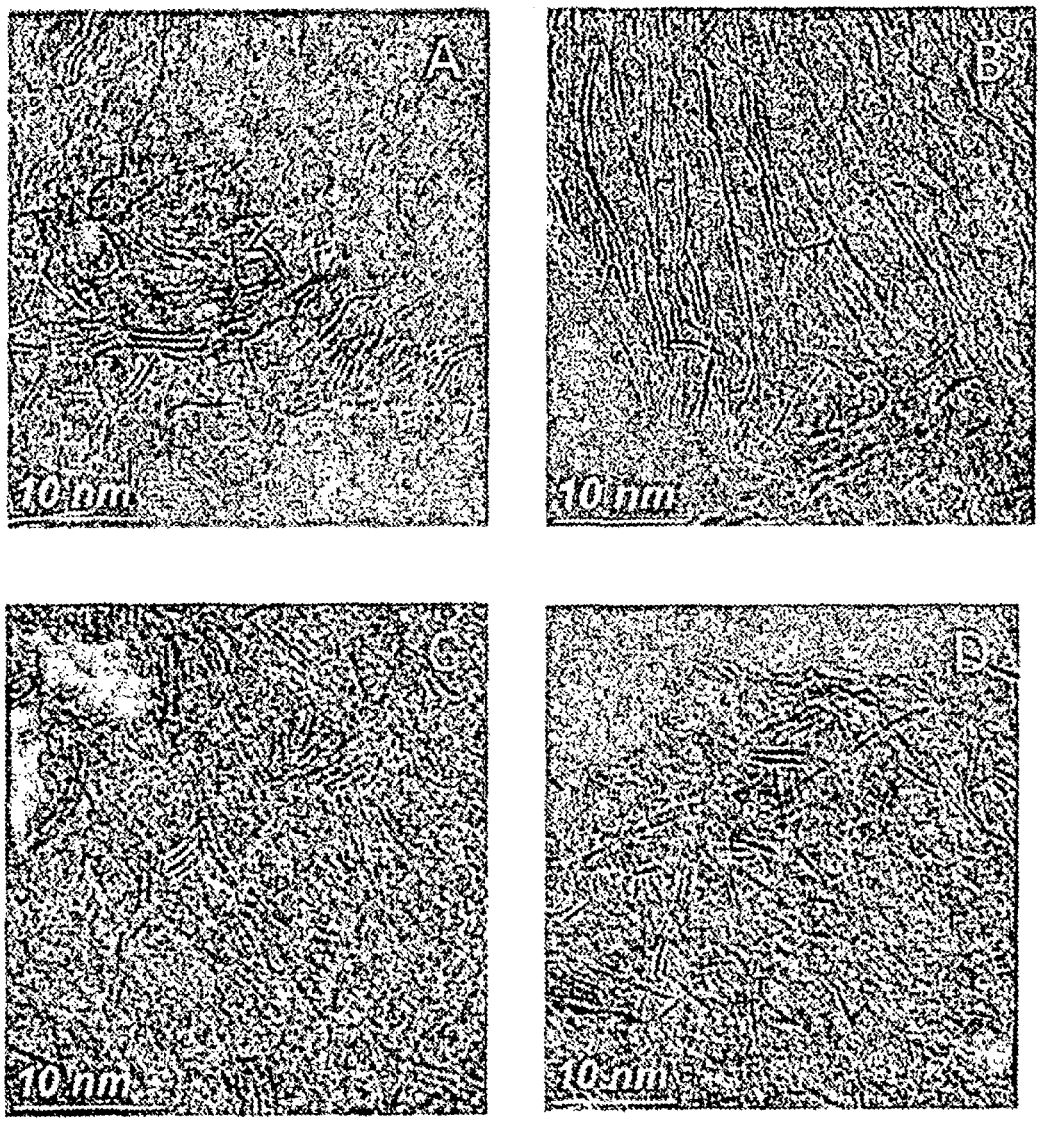
FIG. 1 shows high-resolution electronic transmission microscopy (HRTEM) images of sulfured catalysts: A—CoMo/alumina and B—NiMo/alumina and modified catalysts with 5% by weight of ultra-stable Y-zeolite: C—CoMo/alumina and D—NiMo/alumina.

The present invention provides an effective method for preparation of highly active and selective hydrodesulfurization (HDS) catalysts based on CoMo and NiMo. This was achieved by using precursors decomposed at low temperatures (150-350° C.) and these are produced from typical inorganic salts of Co, Ni and Mo in presence of organic acids.

These precursors were deposited on several supports (-alumina, ultra-stable Y-zeolite and their mixtures) by a method of incipient impregnation. It is intended that these materials are capable of performing a sulfur compound desulfurization present in diesel and gasoline without requiring severe operation conditions. The invention relates to the preparation of supported catalysts, with active phase loads from 12% to 15% by weight of a Group 6 metal in the periodic table and from 2.8 to 4.5% of a second metal of Group 9 or 10 of the periodic table. The catalysts also include ultra-stable Y-zeolite thus promoting direct desulfurization. The catalysts have specific areas between 150 and 280 m$^2$ g$^{-1}$, pore volumes between 0.4 and 0.9 cm$^3$ g$^{-1}$ and pore average diameters between 3 and 10 nm. The prepared multicomponent catalyst is capable of desulfurizing high sulfur-($\leq$36000 ppm) and nitrogen-($\leq$1400 ppm) content heavy gas oil. The preparation method subject of this patent provides optimized morphology and dispersion for MoS$_2$ and Co(Ni)/MoS$_2$ nanostructures which determine the capability for gasoline or diesel HDS processing.

The present invention relates to preparation of supported CoMo o NiMo catalysts which are typical catalysts used for fossil fuel hydrodesulfurization. Catalysts are prepared from organometallic precursors which are decomposed in a temperature range between 150 and 350° C. in presence of organic acids acting as chelating agents. The ability of these catalysts to remove dibenzothiophene (DBT) type compounds substituted with alkyl groups, as well as hydrogenation ability of olefins and aromatics is important to produce ultra-low sulfur fuels. HDS catalyst performance has been reported to depend on the number of I- or II-type CoMoS active sites located on film edges of mixed phase (Topsoe). On the other hand, it has been reported that hydrogenation product selectivity related to direct desulfurization, HID/DSD, depends on cap/edge ratio (Daage) or edge ratio (Topsoe) located on CoMoS phase film. It may be generally said that activity and selectivity of catalysts used in HDS depends on film size and stacking, sulfur deficiency and Co(Ni) position on MoS$_2$ nanostructures. The design of a HDS catalyst must consider the optimization of these parameters to obtain a good performance. An improved design also introduces additives for direct desulfurization increase and hydrogenation site decrease. These additives may be introduced as external agent into an active phase or into the feedstock to be processed. The invention also relates to the addition of zeolite nanocrystals to the support to improve HDS catalyst activity as well as its selectivity toward the direct desulfurization route.

The invention relates to a method of preparation of thermally stable and low cost catalysts for gasoline and diesel hydrodesulfurization without requiring severe operation conditions. The catalyst has a low Mo, Co or Ni metal load based on the impregnated substrate weight (<20% by weight as oxides). Catalyst preparation method comprises a synthesis of Co—Mo and Ni—Mo complexes with some organic acid chelating substrate. These organometallic complex substrates are impregnated in -alumina or in a mixture of -alumina-ultra-stable Y-zeolite as support, with 12-20% by weight of metal, consisting of Mo, Co or Ni, based on impregnated substrate weight, preferably with a total metal load around 17%. The metals are combined in amounts which provide a Co(Ni)/Mo metal atom ratio from 0.28 to 0.41. Y-type zeolite stock from 5 to 20% is introduced into the catalyst as a direct desulfurization additive.

The catalytic formulation of present invention may be used in supports such as -alumina modified with ultra-stable Y-zeolite. This catalyst must be capable of being produced by a single method and to perform desulfurization of sulfur compounds present in gas oil, said preparation method of additive-modified catalysts which may be directly introduced into the catalyst active phase or into a feed stream of a diesel or gasoline hydrotreating unit.

One of the embodiments of present invention consists of a method for preparation of catalysts using precursors which are decomposed at low temperature, between 150 and 350° C., the catalyst precursor is previously prepared from organic acids and metal salts from Group 6 of the periodic table, more specifically Mo or W, and metal salts of Groups 9 or 10 of the periodic table as promoters, preferably Co or Ni, to generate organo-metallic complexes with 12 to 15% by weight of active phase and 2.8 to 4.5% of the promoter. For active phase generation it is possible to use well-known techniques of incipient impregnation or ion exchange with soluble precursors. Preferred precursors are soluble compounds, including nitrates, oxides, etc. Organic solution precipitation and co-precipitation comprising metal organic precursors such as acetates, acetylacetonates, and others, may be also used to generate the active phase, and acids such as malic, acetic, citric, ascorbic, etc., could be used as sources for organic acids.

On this regard, the present invention claims the preparation of novel supported catalysts of CoMo or NiMo, prepared from organometallic precursors which are decomposed at temperatures below 350° C. in presence of organic acids as chelating agents. The new prepared CoMo and NiMo supported catalysts, have specific areas between 150 and 280 m$^2$ g$^{-1}$, pore volumes from 0.4 to 0.9 cm$^3$ g$^{-1}$ and average pore diameters from 3 to 10 nm. L The metals were respectively deposited as follows: Mo from 12 to 15% by weight and for the case of Co or Ni promoters between 2 and 5% by weight over ultra-stable-alumina, ultra-stable Y-zeolite and over a mixture thereof between 5 and 20% by weight of Y-zeolite. This was conducted by means of impregnation or ion exchange techniques. Examples of active phase precursor salts include nitrates, oxides, and others, in combination with organic acids (malic acid, citric acid, acetic acid, etc.).

Zeolite preparation process includes mixing them with organic oxides whether using or not a binder and then the mixture may be extruded with certain shape and size, and then drying to 120° C. and afterwards firing at a temperature of from 300 and 500° C. for 2 to 3 hours.

The catalyst for gasoil or gasoline hydrotreating of present invention uses chemical compounds obtained from organic acids as precursors, such as malic, oxalic or citric acids, and metal salts of Group 6 of periodic table, specifically molybdenum trioxide, molybdic acid or ammonium heptamolybdate, or tungsten equivalent compounds and metal salts of Group 9 or 10 preferably Co or Ni, such as nitrates, acetates and phosphates to generate bimetallic organometallic complexes. After depositing the bimetallic complexes by impregnation on the support disclosed in item 2, they are dried at a temperature between 90 and 110° C., and decomposed at temperatures below 500° C., preferably between 150 and 350° C., and catalysts are obtained with a total metal concentration in the range from 10 to 20% by weight, preferably from 12 to 15% of Mo or W and from 3 to 5% of Co or Ni.

Described catalyst is capable of hydrotreating a heavy gas oil fraction, with 36000 ppm of S and 1400 ppm of N, at a hydrogen partial pressure from 30 to 50 atm, and temperatures from 300 to 380° C. with very high conversion rates. On the other hand, it is capable of hydrotreating a light cyclic gasoil fraction, with 22000 ppm of S and 400 ppm of N, at a hydrogen partial pressure from 30 to 35 atm, and temperatures from 300 to 380° C., similarly with very high conversion rates.

Moreover, the catalyst of present invention in addition to hydrotreating heavy gas oil (SRGO) or light cyclic oil (ACL) fractions, is capable of processing light organosulfur compounds such as thiophene, intermediates such as dibenzothiophene, and multi-substituted such as 4,6 dimethyl dibenzothiophene, also with very high yields.

On the other hand, the method for production of the support comprising from 3 to 20% of an ultra-stable Y-type zeolite, preferably from 5 to 10%, is carried out by using nitric acid as chemical agent. Alumina-zeolites produced by this method have a specific surface area from 280 to 680 m$^2$ g$^{-1}$, a pore volume from 0.4 to 0.9 cm$^3$ g$^{-1}$ and an average pore diameter from 3 to 10 nm.

The catalyst of present invention includes a specific surface area from 150 to 280 m$^2$ g$^{-1}$, a pore volume from 0.4 to 0.9 cm$^3$ g$^{-1}$, an average pore diameter from 3 to 10 nm, and wherein a pore portion (60 to 80%), has a pore diameter between 7 and 9 nm.

Once that the catalyst is observed by transmission electronic microscopy after the presulfurization stage performed in presence of sulfur compounds during 2 h at 400° C., it is possible to identify that precursors from Mo(W)S$_2$ nanostructures with a stack from 1 to 6 films, with a length between 1 and 3 nm, and where the fraction with size from 3 to 6 nm, is between 40 and 50%.

Also, when Mo(W)S$_2$ is observed in a transmission electronic microscope after presulfurization, detection of nanostructures from 1 to 3 layers is possible with size from 2 to 6 nm, wherein the fraction with size from 6 to 10 nm is between 10 and 15% and wherein the fraction with size from 3 to 6 nm is between 85 and 90%.

Said catalyst is obtained from molybdic or tungstic acid or molybdenum trioxide or tungsten, which results in a low cost catalyst, compared to those prepared with ammonium heptamolybdate or metatungstate.

The catalysts of present invention are useful in hydrotreating gas oil fractions. The capacity of these catalysts to remove dibenzothiophene compounds with alkyl substituents, as well as the hydrogenation capacity of olefins and aromatics grants high importance when ultra-low sulfur fuel production is required.

The present invention will be better understood from the following examples, which are only presented with illustrative purposes to allow a full understanding of the preferred embodiments of present invention, without excluding that other non-illustrated embodiments may be present which may be practiced based on above performed detailed description. The methods for preparation of catalytic compositions and the application of said catalytic compositions of present invention are illustrated with the following examples, but are not limited thereto.

EXAMPLES

The invention is described more specifically below making reference to examples though the invention is not limited thereto. All used reagents for sample preparation were obtained from Sigma-Aldrich company.

Examples 1 and 2

To 5 g of deionized water were added 4.42 g of tetrahydrated ammonium molybdate and 4 g of citric acid, followed by heating at 40° C. and stirring for 10 minutes. 0.88 g of acetic acid and 2.71 g of cobalt acetate (Example 1) or nickel acetate (Example 2) were subsequently added and dissolved, followed by stirring at room temperature for 30 minutes to prepare an impregnation solution. At this stage, the pH of impregnation solution was 3.

2 g of -alumina support were poured into an alumina melting pot and the total amount of the impregnation solution mentioned in above paragraph was added with a pipette and the support was mixed with the solution at a temperature of 25° C. for 30 minutes.

Subsequently, the resulting wet catalyst was dried at 110° C. for 12 hours. Ligand removal was achieved by additional catalyst drying with an air flow a 550° C. for 5 hours.

Example 3

To 10 g of deionized water, 3.60 g of molybdenum trioxide and 2.80 g of potassium hydroxide were added, followed by heating at 40° C. and stirring for one hour. 4.99 g of citric acid, 0.88 g of acetic acid and 2.71 g of cobalt acetate were subsequently added and dissolved, followed by stirring at room temperature for 30 minutes to prepare an impregnation solution. This time, the pH of the impregnation solution was 4.

2 g of the -alumina support were poured into an alumina melting pot and the total amount of the impregnation solution mentioned in above paragraph was added with a pipette and the support was mixed with the solution at a temperature of 25° C. for 30 minutes.

Subsequently, the resulting wet catalyst was dried at 110° C. for 12 hours. Ligand removal was achieved by additional catalyst drying with an air flow at 550° C. for 5 hours.

Example 4

3.60 g of molybdenum trioxide and 2.01 g of sodium hydroxide were added to 10 g deionized water, followed by heating at 40° C. and stirring for one hour. 2.88 g of citric acid and 2.78 g of cobalt acetate were subsequently added and dissolved, followed by stirring at room temperature for 30 minutes to prepare an impregnation solution. This time, pH of the impregnation solution was 4.

2 g of -alumina support were poured into an alumina melting pot and the total amount of the impregnation solution mentioned in above paragraph, was added with a pipette and the support was mixed with the solution at a temperature of 25° C. for 30 minutes.

Subsequently, the resulting wet catalyst was dried at 110° C. for 12 hours. Ligand removal was achieved by additional catalyst drying with an air flow a 550° C. for 5 hours.

Examples 5 and 6

To 10 g of deionized water, 3.60 g of molybdenum trioxide and 2.01 g of sodium hydroxide were added followed by heating at 40° C. and stirring for one hour. 2.89 g of malic acid (Example 5) or ascorbic acid (Example 6) and 2.78 g of cobalt acetate were subsequently added and dissolved, followed by stirring at room temperature for 30 minutes to prepare an impregnation solution. This time, pH of the impregnation solution was 4.

2 g of -alumina support were poured into an alumina melting pot and the total amount of the impregnation solution, mentioned in above paragraph, was added with a pipette and the support was mixed with the solution at a temperature of 25° C. for 30 minutes. Subsequently, the resulting wet catalyst was dried at 110° C. for 12 hours. Ligand removal was achieved by additional catalyst drying with an air flow a 550° C. for 5 hours.

Example 7

3.60 g of molybdenum trioxide and 2.80 g of potassium hydroxide were added to 10 g of deionized water, followed by heating at 40° C. and stirring for one hour. 4.99 g of citric acid, 0.88 g of acetic acid and 3.68 g of nickel acetate were subsequently added and dissolved, followed by stirring at room temperature for 30 minutes to prepare an impregnation solution. This time, pH of the impregnation solution was 4.

2 g of -alumina support were poured into an alumina melting pot and the total amount of the impregnation solution mentioned in above paragraph was added with a pipette and the support was mixed with the solution at a temperature of 25° C. for 30 minutes. Subsequently, the resulting wet catalyst was dried at 110° C. for 12 hours. Ligand removal was achieved by additional catalyst drying with an air flow at 550° C. for 5 hours.

Example 8

To 7 g of deionized water were added 4.04 g of phosphomolybdic acid and 3.8 g of citric acid and 2.8 g of cobalt acetate were subsequently added and dissolved, followed by stirring for 3 hours to prepare an impregnation solution. This time the pH of the impregnation solution was 4.2 g of -alumina support were poured into an alumina melting pot and the total amount of the impregnation solution mentioned in above paragraph was added with a pipette and the support was mixed with the solution at a temperature of 25° C. for 30 minutes. Subsequently, the resulting wet catalyst was dried at 110° C. for 12 hours. Ligand removal was achieved by additional catalyst drying with an air flow at 550° C. for 5 hours.

Examples 9, 10 and 11

3.8 g of citric acid (Example 9) or malic acid (Example 10) or ascorbic acid (Example 11) were added to 5 g of deionized water, and 4.9 g of molybdic acid and 2.8 g of cobalt acetate were subsequently added and dissolved, followed by heating at 40° C. and stirring for one hour to prepare an impregnation solution. This time the pH of the impregnation solution was 4. Then, 2 g of -alumina support were poured into an alumina melting pot and the total amount of the impregnation solution mentioned in above paragraph, was added with a pipette and the support was mixed with the solution at a temperature of 25° C. for 30 minutes. Subsequently, the resulting wet catalyst was dried at 110° C. for 12 hours. Ligand removal was achieved by additional catalyst drying with an air flow a 550° C. for 5 hours.

Example 12

2.8 g of citric acid were added to 5 g of deionized water, then 4.9 g of molybdic acid and 2.7 g of nickel acetate were added to this mixture and dissolved, followed by heating at 40° C. in stirring for one hour to prepare an impregnation solution. At this time, the registered pH of the impregnation solution was 4.2 gr of -alumina support were poured into a high purity alumina melting pot. All the impregnation solution was added to the mixture with a pipette and the support was mixed with the solution at 25° C. for 30 minutes. Afterwards, the resulting wet catalyst was dried at 110° for 12 hours. Ligand removal was reached with additional catalyst drying in air flow at 550° for 5 hours.

Example 13

A Y-zeolite ultra-stable powder comprising $SiO_2/Al_2O_3$ with a molar ratio of 30 (BET surface area of 150 at 280 $m^2$ $g^{-1}$ and a unit cell size of 2.4 nm) was peptized with ultra-stable-alumina (BET surface area of 150 at 280 $m^2$ $g^{-1}$, pore volume of 0.4 at 0.9 $cm^3$ $g^{-1}$, and average pore diameter of 3 at nm) using nitric acid as peptizing agent. The peptizing agent was mechanically added to the mixture of -alumina-zeolite by an impregnation method under mixing with stirring. The sample was dried in an oven at a temperature of 80 to 120° C. for 12 hours and was fired in a muffle at 500° C. for 4 hours.

Example 14 and 15

3.8 g of citric acid were added to 5 gr of deionized water, subsequently 2.9 g of molybdic acid and 2.7 g of cobalt acetate (example 14) or nickel acetate (example 15) were added and dissolved into above mixture, followed by heating at 40° C. with stirring for one hour to prepare an impregnation solution. In this stage, the pH of the impregnation solution was 4. Then, 2 gr of -alumina-zeolite (5% wt Y-Zeolite) support prepared as described in example 13 were poured into a high purity alumina melting pot. All above impregnation solution was added with a pipette and the support was mixed with a solution at 25° C. for 30 minutes. Subsequently, the resulting wet catalyst was dried at 110° C. for 12 hours. Ligand removal was achieved with drying additionally the catalyst in air flow at 550° C. for 5 hours.

The catalyst described in examples 1-15 was characterized by means of high resolution transmission electronic microscopy (TEM) using a JEOL 2010 microscopy. TEM images are shown in FIG. 1

Figure 2:
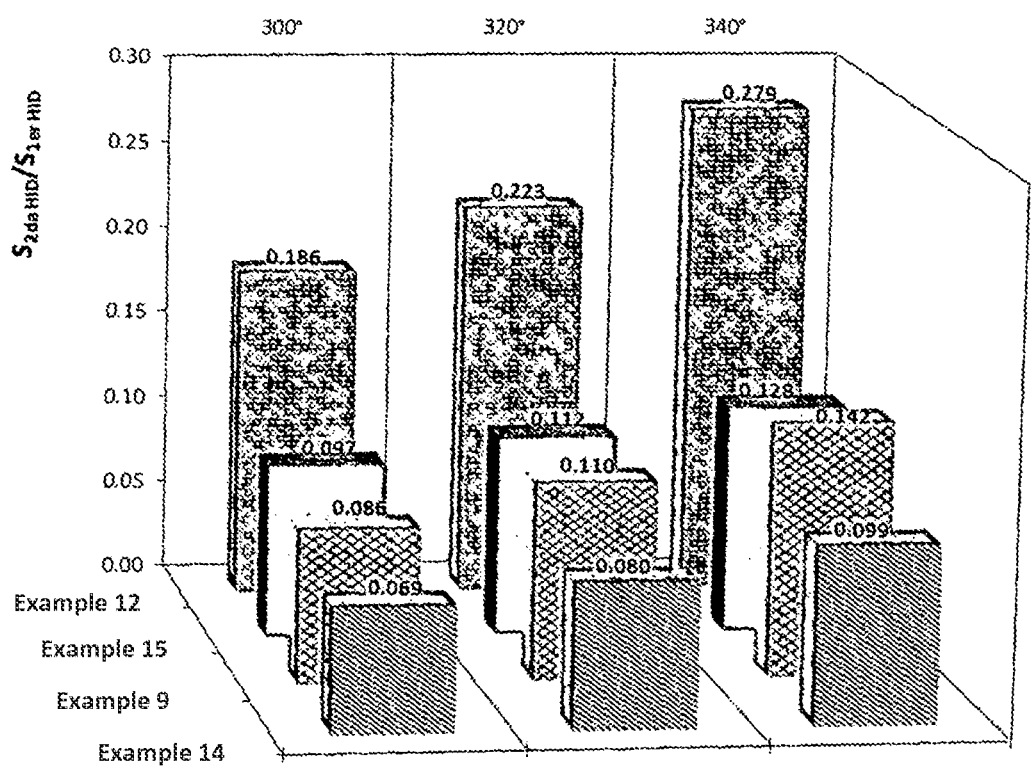
FIG. 2 illustrates a graph showing thiophene selectivity; hydrogenation which produces butene ($S_{1a\ HID}$) and second hydrogenation which produces butane ($S_{2da\ HID}$)

Referred to FIG. 1, TEM high resolution images of a catalyst prepared as described in examples 1-15 show the formation of sulfide nanostructures with 2-3 sulfur layers with size from 3 to 10 nm. As to FIG. 2, it is possible to notice that $S_{2da\ HID}/S_{1a\ HID}$ selectivity ratio is slightly increased with temperature indicating that the first hydrogenation path is the main route.

Properties of Fed Gas Oil:
Gas oil type: Direct distillation heavy gas oil from Mexican Oil Company (PEMEX), proceeding from Madero refinery, having 36000 ppm of S and 1400 ppm of N with an approximate density of 0.926 g $mL^{-1}$. All gases were obtained from Infra company (Mexico)

DBT Catalytic Evaluation

All catalysts prepared as described in examples 1 to 16 were tested in DBT hydrodesulfurization. The catalysts were activated in a continuous flow tubular reactor with a mixture of $H_2S$ (15% mol) and $H_2$. The catalyst was heated at 400° C. with a ramp of 10° C./min, keeping at this temperature for 1 hour and cooled up to 50° C. in the same atmosphere. Subsequently, gas flow was replaced with nitrogen and the catalyst was cooled at room temperature to complete the activation treatment. Catalytic activity analysis conditions of sulfured materials were as follows: temperature of 593K under hydrogen atmosphere at 5 MPa for 8 hours, using 200 mg of sulfured catalyst and $1.22\times10^{-3}$ moles of DBT dissolved in 100 mL of hexadecane (Sigma-Aldrich Co.). The reactor was purged with nitrogen and heated under stirring until reaching reaction temperature, and hydrogen was subsequently introduced (Ptot=50 atm). Reaction time was counted from this moment. Total pressure was constantly controlled during the reaction course by adding hydrogen to compensate its consumption. Samples were periodically monitored by gas chromatography for quantitative analysis.

The catalytic activity was expressed with initial reaction rate (moles of DBT transformed per second and per gram of catalyst). Reaction products of DBT HDS were observed by GC: biphenyl (BP), cyclohexylbenzene (CHB) and dicyclohexyl (DCH). Disappearance of DBT occurs by two ways: By direct desulfurization route (DDS) and by hydrogenation (HID) route. The product considered to calculate the selectivity towards DDS was BP and for HID route the sum of two hydrogenated products: CHB and DCH. Results of catalytic activity and HID/DSD ratio for DBT HDS are shown in table 1.

TABLE 1

| | Reaction @ 320° C. and 54 atm. | |
|---|---|---|
| Catalyst | initial reaction rate $r_{o\ HDS}\times10^{-8}$ $(mol_{DBT} \cdot g^{-1}_{cat} \cdot s^{-1})$ | HID/DSD ratio |
| Example 1 | 76 | 0.26 |
| Example 2 | 124 | 0.41 |
| Example 3 | 18 | 0.05 |
| Example 4 | 10 | 0.03 |
| Example 5 | 9 | 0.04 |
| Example 6 | 6 | 0.01 |
| Example 7 | 16 | 0.08 |
| Example 8 | 13 | 0.02 |
| Example 9 | 80 | 0.21 |
| Example 10 | 60 | 0.17 |
| Example 11 | 32 | 0.16 |
| Example 12 | 135 | 0.36 |
| Example 14 | 95 | 0.13 |
| Example 15 | 143 | 0.07 |

Catalytic Evaluation of Thiophene

Catalysts prepared as described in examples 9 to 12, were analyzed in thiophene desulfurization.

The catalyst was packed in a "U" shape pyrex reactor and activated with a mixture of $H_2/H_2S$ (10% mol). The catalyst was heated up to 400° C. with a ramp of 10° C./min, and kept at this temperature for 2 hours, and subsequently cooled to 100° C. using the same atmosphere. Subsequently, the activation gas flow was replaced with nitrogen and the catalyst was cooled at room temperature.

After activation pretreatment, the catalytic activity test in thiophene HDS was carried out in a continuous flow microreactor at atmospheric pressure. $H_2$ flow was of 50 mL $min^{-1}$ which is previously passed through a saturator with thiophene at 273K.

The reaction was carried out at 3 different temperatures with the reaction initially performed at 613K during 12 hours so that the catalyst (100 mg) is stabilized and reaches a steady state. Subsequently, temperature is changed sequentially at 573, 593 and is returned to 613K, and waiting at each temperature until reaching a steady state. Products were analyzed on-line by a gas chromatograph equipped with FID detector and a 30 m×0.53 mm capillary column. Specific reaction rate ($r_r$) was determined as follows $r_r$=(F/m)X wherein F/m is the molar flow ratio of reactant per gram of catalyst and X is thiophene conversion at steady state at any temperature. Detected products by GC and identified by mass chromatography were trans-butene, 1-butene, cis-butene and butane. The presence of butadiene was not detected. Two paths were taken as main reaction routes in order to show selectivity. The first hydrogenation produces butene ($S_{1a\ HID}$) and the second hydrogenation produces butane ($S_{2da\ HID}$), these species were considered to calculate the selectivity ratio ($S_{2daHID}/S_{1a\ HID}$). The results of catalytic activity in hidrodesulfurización of thiophene at different temperatures are shown in Table 2.

TABLE 2

| | Reaction temperature | | |
|---|---|---|---|
| | 300° C. | 320° C., | 340° C., |
| | $r_{HDS \times 10}^{-8}$ | $r_{HDS \times 10}^{-8}$ | $r_{HDS \times 10}^{-8}$ |
| | $(mol_{tio} \cdot g^{-1}_{cat} \cdot$ | $(mol_{tio} \cdot g^{-1}_{cat} \cdot$ | $(mol_{tio} \cdot g^{-1}_{cat} \cdot$ |
| Catalyst | $s^{-1}$) | $s^{-1}$) | $s^{-1}$) |
| Example 9 | 117 | 204 | 297 |
| Example 12 | 175 | 273 | 360 |
| Example 14 | 89 | 141 | 238 |
| Example 15 | 65 | 102 | 160 |

Reaction pressure 1 atm. of $H_2$, (r) reaction rate in steady state.

Catalytic Evaluation of Heavy Gas Oil (SRGO)

Catalysts prepared as described in examples 9 to 12 were tested in hydrodesulfurization of heavy gas oil (SRGO) proceeding from PEMEX Madero refinery. (contents: 36000 ppm of S and 1400 ppm of N).

Catalysts were put into a packed bed continuous flow reactor (SiC) in $H_2$ atmosphere using a flow of 20 mL min$^{-1}$ and a flow of gas oil of 0.078 mL min$^{-1}$ (~4 g h$^{-1}$) with a pressure of 40 bar.

The catalyst was packed between two beds of 4 g of SiC and quartz fiber. Initial stabilization of the catalyst was carried out at 360° C. for 10 hours. The catalyst was previously sulfured in-situ in a flow of $H_2S$ (5% mol) in balance with $H_2$ at 400° C. for 4 hours with a ramp of 4° C./min. In order to obtain a reasonable comparison of the catalyst, the specific reaction order was required to be determined for this gas oil.

Reactor mass balance and the corresponding integration provide the equation used for specific reaction order calculation.

$$\frac{1}{n-1}\left[\left(\frac{1}{Se}\right)^{n-1} - \left(\frac{1}{Ss}\right)^{n-1}\right] = K_{app}\frac{aL}{F}$$

Wherein:
F—Volumetric flow [cm$^3$ h$^{-1}$],
a—Cross-section area [cm$^2$],
S—Total molar concentration [mmol g$^{-1}$],
Se—Sulfur concentration at reactor inlet.
Ss—Sulfur concentration at reactor outlet.
$K_{app}$—Apparently constant reaction rate [g$^{n-1}$ mmol$^{-(n-1)}$ h$^{-1}$],
N—Reaction Order
L—Catalytic bed length.
V—Catalytic bed volume.

By fixing the temperature at 320° C. and with a variation of mass flow, the obtained reaction order was 1.8. Subsequently, analysis at this temperature was continued and results for gasoil hydrodesulfurization are shown in Table 3.

TABLE 3

| Catalyst | Constant ratio, $K_{app}$ g$^{0.8}$ mmol$^{-0.8}$ h$^{-1}$ |
|---|---|
| Example 9 | 17.83 |
| Example 12 | 21.45 |
| Example 14 | 16.80 |
| Example 15 | 16.98 |

Catalytic Evaluation of Light Gas Oil

Catalysts prepared as described in examples 1 and 14 were tested in hydrodesulfurization of light gas oil which comprises 20000 ppm of S and 400 ppm of N.

Catalysts were put into a packed flow continuous flow reactor (SiC) in a $H_2$ atmosphere at a pressure of 40 bar VVH 2 h$^{-1}$.

The catalyst was packed between two beds of 4 g of SiC and quartz fiber. Initial stabilization of the catalyst was carried out at 360° C. for 10 hours. Previously, the catalyst was sulfured in-situ in a flow of $H_2S$ (15% mol) in balance with $H_2$ at 400° C. for 4 hours with a ramp of 4° C./min.

Results in gas oil hydrodesulfurization are shown in Table 4.

TABLE 4

| | ppm of S | | |
|---|---|---|---|
| Sample | 300° C. | 320° C. | 360° C. |
| Example 01 | 5500 | 1950 | 235 |
| Example 14 | 4150 | 1420 | 130 |

Although certain embodiments of the invention have been illustrated and described, it should be remarked that several modifications thereof are possible, but said modifications would not represent being apart from the true scope of the invention. Therefore, the present invention shall not be considered restricted except by the provisions in the state of the art, as well as from the scope of attached claims.

REFERENCES

U.S. Pat. No. 7,618,916 B2 November 2009 Fujikava T., Kato M., Nakajima N., Hashimoto M.
U.S. Pat. No. 0,230,026 A1 September 2009 Ki-Hyouk Choi, Sameer Ali Al-Ghamdi, Ali H. Ali-Shareef, Ali H.
U.S. Pat. No. 4,277,373 July 1981 Willard H. Sawyer, Baton Rouge, Neville L. Cull, Baker, both of La.
U.S. Pat. No. 5,308,472 August 1994. P. S. E. Dai, C. N. Campbell, B. R. Martin, D. E. Sherwood
U.S. Pat. No. 4,120,826 1978. Ebel, R. H., Spitzer, D. P., Bambrick, W. E.
U.S. Pat. No. 6,281,158 B1 2001 Gabrielov, A. G., Killough, P. M.
U.S. Pat. No. 4,409,131 1983 Fetchin, J. A.,
2009/0321320 2009 Wu, J., Ellis, E. S., Sokolovskii, V., Lowe, D. M., Volpe, A. F.
EP 0,181,035 A2 May 1986 Thompson Mark Stewart
Ding L., Zheng Y., Zhang Z., Ring Z., J. Chen Appl. Catal. A: Gen. 319 (2007) 25.
Ding L., Zheng Y., Zhang Z., Ring Z., Chen, J., Catal. Today 125 (2007) 229.

Ding L., Zheng Y., Yang H., Parviz R., Appl. Catal. A: Gen. 353 (2009) 17.

Duan, A., Wan, G., Zhang, Y., Zhao, Z., Jiang, G., Liu, J., Catal. Today 175 (2011) 485.

Duan A., Gao Z., Huo Q., Wang C., Zhang D., Jin M., Jiang G., Zhao Z., Pan H., Chung Fayruzov D. Kh., Fayruzov R. Kh., Sitdikova A. V., Baulin O. A., Rahimov M. N., Oil and Gas Business, 2009.

Inamura K., Uchikawa K., Matsuda S., Akai Y., Appl. Surf. Sci. 121/122 (1997) 468.

Klimov O. V., Pashigreva A. V., Bukhtiyarova G. A., Budukva S. V., Fedotov M. A., Kochubey D. I., Chesalov Y. A., Zaikovskii V. I., Noskov A. S., Catal. Today 150 (2010), 196.

Klimov, O. V., Pashigreva, A. V., Fedotov, M. A., Kochubey, D. I., Chesalov, Y. A., Bukhtiyarova, G. A., Noskov, A. S., J. Mol. Catal. A: Chemical 322 (2010) 80.

Lopez-Agudo A., Cid R., Orellana F., Fierro J. L. G., Polyhedron 5 (1986) 187.

Marafi A., Al-Hindi A., Stanislaus A., Deep desulfurization of full range and low boiling diesel streams from Kuwait Lower Fars heavy crude, Fuel Processing Technology 88 (2007) 905.

Pashigreva A. V., Bukhtiyarova G. A., Klimov O. V., Chesalov Yu. A., Litvak G. S., Noskov A. S., Catal. Today 149 (2010), 19.

Ren J., Wang A., Chen X. Li, Liu H., Hu Y., Appl. Catal. A: Gen. 344 (2008) 175.W.J.J.

Rinaldi, N., Usman, Al-Dalama, K., Kubota, T., Okamoto, Y., Appl. Catal. A: General 360 (2009) 130.

Solis D., Agudo A. L., Ramirez J., Klimova T., Catal. Today 116 (2006) 469. K., Energy Fuels 24 (2010) 796.

Song C., Catal. Today 86 (2003), 211.

Sun M., Nicosia D., Prins R., Catal. Today 86 (2003) 173.

Topsøe H., Clausen B. S., Massoth F. E., In Hydrotreating Catalysts: Science and Technology; Springer: Berlin, 1996.

Welters, V. H. J. of Beer, R. A. van Santen, Appl. Catal. A 19 (1994) 253.

Yumoto M., Usui K., Watanabe K., Idei K., Yamazaki H., Catal. Today 35(1997) 45.

Yin H., Zhou T., Liu Y., Chai Y., Liu J. C., Natural Gas Chem. 20 (2011) 441.

The invention claimed is:

1. A catalyst for gasoil or gasoline hydrotreating comprising
a precursor consisting of chemical compounds obtained from organic acids and metal salts selected from the group consisting of metals from Group VI of the periodic table and metals from Group IX or X of the periodic table, and
an alumina-zeolite support comprising an alumina containing ultra-stable Y-type zeolite,
wherein the precursor is a bimetallic organometallic complex with 12 to 15% by weight of the Group VI metal and 2.8 to 4.5% by weight of the Group IX or X metal, and wherein the alumina-zeolite support has a specific surface area of from 150 to 280 $m^2 \, g^{-1}$.

2. The catalyst according to claim 1, wherein the metal salts of Group VI of the periodic table is Mo or W.

3. The catalyst according to claim 1, wherein the organic acids are selected from the group consisting of malic acid, oxalic acid and citric acid.

4. The catalyst according to claim 1, wherein the metal salts of Group VI of the periodic table are selected from the group consisting of molybdenum trioxide, molybdic acid, ammonium heptamolybdate, equivalent compounds of tungsten.

5. The catalyst according to claim 1, wherein the support contains from 3 to 20% of the ultra-stable Y-type zeolite.

6. The catalyst according to claim 5, wherein the support contains from 5 to 10% of the ultra-stable Y-type zeolite.

7. The catalyst according to claim 1, wherein the support comprises pores and between 60 and 80% of the pores have a pore diameter between 7 and 9 nm.

8. The catalyst according to claim 1, wherein the support is obtained using nitric acid as chemical agent.

9. The catalyst according to claim 1, wherein the catalyst has a total metal concentration in the range from 10 to 20% by weight.

10. The catalyst according to claim 9, wherein the catalyst has a total metal concentration from 12 to 15% of Mo or W and from 3 to 5% of Co or Ni.

11. The catalyst according to claim 1, wherein it is useful in hydrotreating of a heavy gas oil fraction, with 36000 ppm of S and 1400 ppm of N, at a hydrogen partial pressure from 30 to 50 atm, and temperatures from 300 to 380° C.; or hydrotreating of a light cyclic gasoil fraction, with 22000 ppm of S and 400 ppm of N, at a hydrogen partial pressure from 30 to 35 atm, and temperatures from 300 to 380° C.

12. The catalyst according to claim 1, wherein it is useful in processing of light organosulfur compounds, intermediate organosulfur compounds, and multisubstituted organosulfur compounds.

13. The catalyst according to claim 12, wherein the light organosulfur compound is thiophene, the intermediate organosulfur compound is dibenzothiophene, and the multisubstituted organosulfur compound is 4, 6 dimethyl dibenzothiophene.

14. A method of production of the catalyst according to claim 1 for gasoil or gasoline hydrotreating comprising the steps of:
a) depositing bimetallic complexes by support impregnation;
b) drying at a temperature between 90 and 110° C.; and
c) decomposing at a temperature lower than 500° C.

15. The method of production of a catalyst for gasoil or gasoline hydrotreating according to claim 14, wherein techniques in combination with hydrothermal treatment, wet impregnation and acidic attack are used.

16. The method of production of a catalyst for gasoil or gasoline hydrotreating according to claim 14, wherein the decomposing is at a temperature between 150-350° C.

17. A catalyst for gasoil or gasoline hydrotreating comprising
a precursor consisting of chemical compounds obtained from organic acids and metal salts; and
an alumina-zeolite support,
wherein the precursor forms nanostructures of Mo(W)$S_2$ with a stack of 1 to 6 films, with a length between 1 and 3 nm, and wherein the fraction with size from 3 to 6 nm, is found between 40 and 50%.

18. The catalyst according to claim 17, wherein the Mo(W)$S_2$ forms nanostructures from 1 to 3 layers with size from 2 to 6 nm, wherein the fraction with size from 6 to 10 nm is between 10 and 15% and wherein the fraction with size from 3 to 6 nm is between 85 and 90%.

19. A catalyst for gasoil or gasoline hydrotreating comprising
a precursor consisting of chemical compounds obtained from organic acids and metal salts; and
an alumina-zeolite support, wherein the support has a specific surface area from 280 to 680 m² g⁻¹, a pore volume from 0.4 to 0.9 cm×g⁻¹ and an average pore diameter from 3 to 10 nm.

* * * * *